United States Patent
Huang et al.

(10) Patent No.: US 8,213,513 B2
(45) Date of Patent: Jul. 3, 2012

(54) EFFICIENT DATA PREDICTION AND DATA REUSE MOTION ESTIMATION ENGINE FOR SYSTEM-ON-CHIP DESIGN

(75) Inventors: Shih-Chia Huang, Taipei (TW); Sy-Yen Kuo, Taipei (TW)

(73) Assignee: National Taiwan University, Taipei (TW)

( * ) Notice: Subject to any disclaimer, the term of this patent is extended or adjusted under 35 U.S.C. 154(b) by 464 days.

(21) Appl. No.: 12/469,690

(22) Filed: May 21, 2009

(65) Prior Publication Data

US 2010/0266044 A1 Oct. 21, 2010

(30) Foreign Application Priority Data

Apr. 16, 2009 (TW) .............................. 98112678 A (51) Int. Cl.
 *H04N 11/04* (2006.01)
(52) U.S. Cl. .......... 375/240.16; 375/240.14; 375/240.12
(58) Field of Classification Search ............. 375/240.12, 375/240.14, 240.16
See application file for complete search history.

(56) References Cited

U.S. PATENT DOCUMENTS

| | | | | |
|---|---|---|---|---|
| 7,362,808 | B2 * | 4/2008 | Kang | 375/240.16 |
| 2004/0008780 | A1 * | 1/2004 | Lai et al. | 375/240.16 |
| 2004/0028133 | A1 * | 2/2004 | Subramaniyan et al. | 375/240.16 |
| 2010/0266043 | A1 * | 10/2010 | Huang et al. | 375/240.16 |
| 2010/0322314 | A1 * | 12/2010 | Huang et al. | 375/240.16 |

OTHER PUBLICATIONS

Ching-Yeh Chen et al., "Level C+ Data Reuse Scheme for Motion Estimation With Corresponding Coding Orders," IEEE Transactions on Circuits and Systems for Video Technology, vol. 16, No. 4, Apr. 2006, pp. 553-558.

Renxiang Li et al., "A New Three-Step Search Algorithm for Block Motion Estimation," Express Letter, IEEE Transactions on Circuits and Systems for Video Technology, vol. 4, No. 4, Aug. 1994, pp. 438-442.

Jen-Chieh Tuan et al., "On the Data Reuse and Memory Bandwidth Analysis for Full-Search Block-Matching VLSI Architecture," IEEE Transactions on Circuits and Systems for Video Technology, vol. 12, No. 1, Jan. 2002, pp. 61-72.

* cited by examiner

*Primary Examiner* — Christopher S Kelley
*Assistant Examiner* — Jonathan Torchman
(74) *Attorney, Agent, or Firm* — Jianq Chyun IP Office (57) ABSTRACT

A data reading method for motion estimation in an embedded system is provided. The embedded system includes an external memory device and a video encoding device, wherein the external memory device stores a first frame, and the video encoding device has an internal memory. First, a second frame is divided into M×N sub frame sets, wherein each of the sub frame sets has O×P sub frames. Then, each of the sub frame sets is selected in a calculation sequence, and the selected sub frame set is stored into the internal memory. Next, a predicted search path of each sub frame in the selected sub frame set is calculated. Thereafter; a predicted reading range is determined, wherein the predicted reading range includes the predicted search paths of the sub frames. Finally, a comparison data is read from the first frame according to the predicted reading range.

8 Claims, 5 Drawing Sheets

EFFICIENT DATA PREDICTION AND DATA REUSE MOTION ESTIMATION ENGINE FOR SYSTEM-ON-CHIP DESIGN

CROSS-REFERENCE TO RELATED APPLICATION

This application claims the priority benefit of Taiwan application serial no. 98112678, filed on Apr. 16, 2009. The entirety of the above-mentioned patent application is hereby incorporated by reference herein and made a part of specification.

BACKGROUND OF THE INVENTION

1. Field of the Invention

The present invention generally relates to a data reading or reusing method for motion estimation, and more particularly, to a data reading or reusing method for motion estimation in an embedded system.

2. Description of Related Art

Along with the widespread of the Internet and the advancement of multimedia transmission techniques, digital video communication has become a very important part in our daily life. Generally speaking, a digital video carries a large quantity of data. Accordingly, a digital video has to be compressed in order to reduce the space required for storing the digital video and the bandwidth for transmitting the digital video. An advanced digital video compression technique should be adopted to fully utilize the limited transmission bandwidth and to transmit the most digital videos of the highest quality. H.264 is one of the most advanced video compression techniques and which is established by the International Telecommunication Union (ITU) Video Coding Experts Group (VCEG) together with the International Organization for Standardization (ISO)/International Electrotechnical Commission (IEC) Moving Picture Experts Group (MPEG).

Even though the H.264 technique offers very good compression rate and compression quality, since it supports different block configurations and multiple references, the calculation load thereof is enormous, and at least 80% of the calculation load is for motion estimation.

Figure 1:
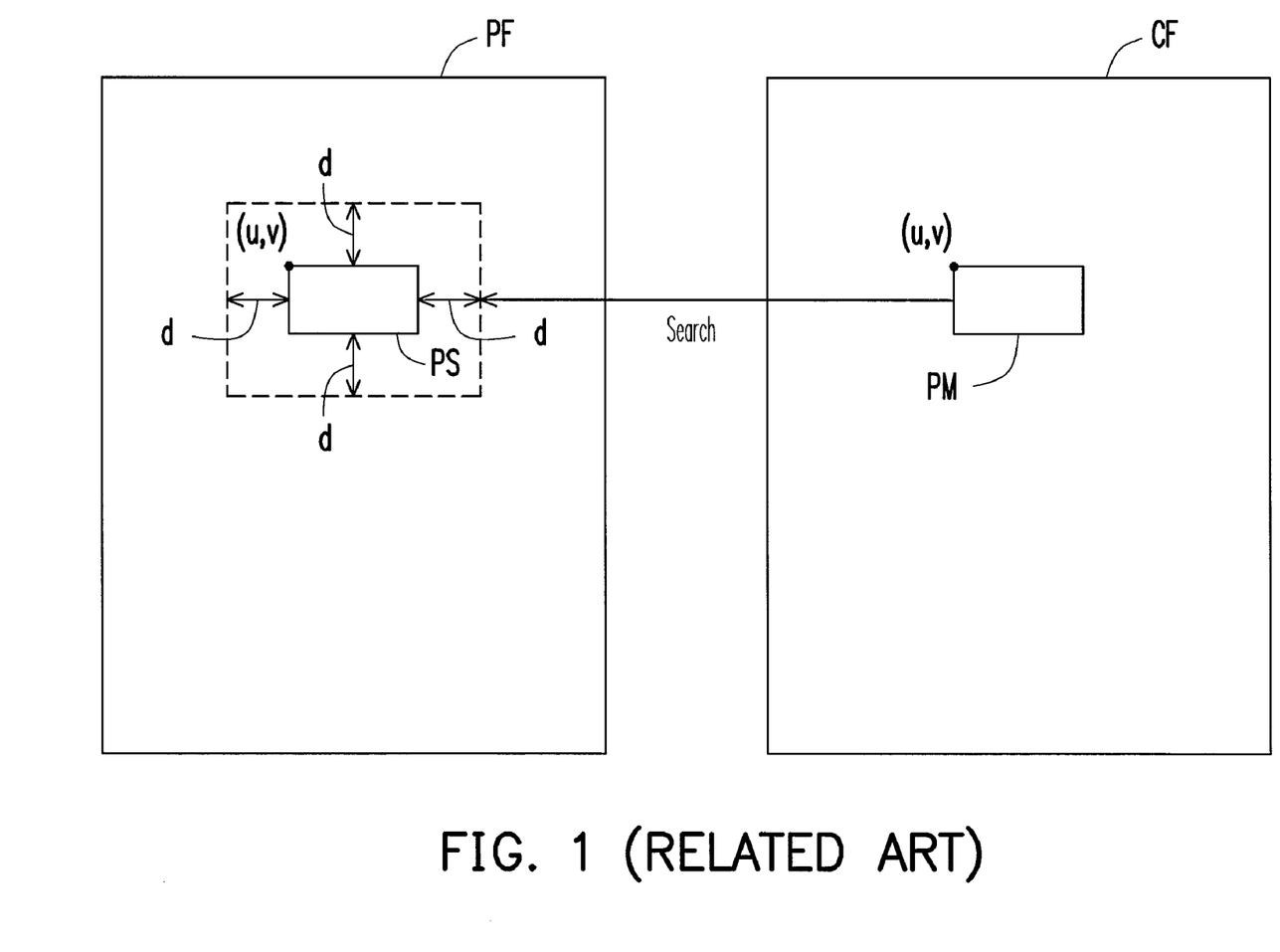
FIG. 1 illustrates the conventional motion estimation in video compression.

FIG. 1 illustrates the conventional motion estimation in video compression. Referring to FIG. 1, when motion estimation is carried out, a current frame CF is compared with a previous frame PF. The current frame CF is usually divided into a plurality of sub frames, wherein the sub frames include a sub frame PM, and the position of the sub frame PM in the current frame CF is represented with the coordinates (u, v). After that, the sub frames in the current frame CF are sequentially selected. Whether there is any sub frame in the previous frame PF similar to the selected sub frame PM is then determined. A sub frame PS in the previous frame PF corresponding to the sub frame PM in the current frame CF is considered the center of the previous frame PF (i.e., the position of the sub frame PS in the previous frame PF is also represented with the coordinates (u, v)). The area within a predetermined distance d around the sub frame PS is referred to as a search window SW, and the predetermined distance is referred to as a search range. Sub frames are randomly selected within the search window and compared with the sub frame PM to find the most similar sub frame, and this action is called motion estimation.

It should be mentioned that the motion estimation requires a large quantity of data to be read and accordingly a good data reading and reusing method should be adopted to reduce the calculation load and memory usage and to maintain the compression quality.

SUMMARY OF THE INVENTION

Accordingly, the present invention is directed to a data reading method for motion estimation in an embedded system, wherein the calculation algorithm of the motion estimation is improved, and the comparison data to be read is determined by calculating a predicted motion vector or a predicted search path of each sub frame in a sub frame set, so that the calculation load and the memory usage are both reduced.

The present invention is directed to an embedded system with improved calculation algorithm for motion estimation therein, wherein a comparison data to be read from an external memory device into a video encoding device is determined by calculating a predicted motion vector or a predicted search path of each sub frame in a sub frame set, so that the calculation load and the memory usage are both reduced.

The present invention provides a data reading method for motion estimation in an embedded system. The embedded system includes a video encoding device and an external memory device, wherein the video encoding device includes an internal memory, and the external memory device stores a first frame. In the data reading method, a second frame is first divided into M×N sub frame sets, and each of the sub frame sets includes O×P sub frames, wherein M, N, O, and P are all integers greater than or equal to 1. Then, each of the sub frame sets is selected from the second frame in a calculation sequence, wherein the selected sub frame set is stored into the internal memory. Next, a predicted search path of each sub frame in the selected sub frame set is calculated. Thereafter, a predicted reading range is determined, wherein the predicted reading range includes the predicted search paths of the sub frames. Finally, a comparison data is read from the first frame in the external memory device according to the predicted reading range.

According to an exemplary embodiment of the present invention, in the data reading method for motion estimation, a predicted motion vector of each sub frame in the selected sub frame set is first calculated, and the predicted search path of the sub frame is then calculated according to the predicted motion vector of the sub frame and a search pattern. According to an exemplary embodiment of the present invention, the search pattern adopts a hierarchical search algorithm (N-step search algorithm).

According to an exemplary embodiment of the present invention, in the data reading method for motion estimation, the calculation sequence is to calculate from left to right and from top to bottom.

According to an exemplary embodiment of the present invention, in the data reading method for motion estimation, after the comparison data is read, a real motion vector of each sub frame in the selected sub frame set is further calculated according to the comparison data.

The present invention further provides an embedded system including an external memory device and a video encoding device, wherein the external memory device stores a first frame, and the video encoding device includes an internal memory. The embedded system divides a second frame into M×N sub frame sets, and each of the sub frame sets includes O×P sub frames, wherein M, N, O, and P are all integers greater than or equal to 1. The embedded system selects each of the sub frame sets from the second frame in a calculation sequence, wherein the selected sub frame set is stored into the internal memory. The video encoding device calculates a predicted search path of each sub frame in the selected sub frame set and determines a predicted reading range, wherein the predicted reading range includes the predicted search paths of the sub frames. The video encoding device further reads a comparison data from the first frame in the external memory device into the internal memory according to the predicted reading range.

According to an exemplary embodiment of the present invention, the video encoding device in the embedded system further includes a calculation unit, wherein the calculation unit first calculates a predicted motion vector of each sub frame in the selected sub frame set and then calculates the predicted search path of the sub frame according to the predicted motion vector of the sub frame and a search pattern.

As described above, in the present invention, the comparison data to be read is determined according to a predicted motion vector or a predicted search path of each sub frame in a sub frame set. Accordingly, when the motion estimation is actually carried out, the quantity of data to be read, the calculation load, and the memory usage are all reduced. In addition, when the motion estimation is actually carried out, the comparison data is read in unit of each sub frame set so that the quantity of data repeatedly read between the sub frames is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In exemplary embodiments of the present invention, a predicted motion vector or a predicted search path of a target sub frame is calculated according to the real motion vector of a processed sub frame on which motion estimation has been performed, wherein one or more sub frames form a sub frame set, and a comparison data to be read is determined according to the predicted motion vector or the predicted search path of each sub frame in the sub frame set. In addition, the comparison data is read in unit of the sub frame set, so that the quantity of data repeatedly read between the sub frames, the calculation load, and the memory usage are all reduced. Below, exemplary embodiments of the present invention will be described with reference to accompanying drawings, wherein like reference numerals refer to like elements through out the drawings.

In an exemplary embodiment of the present invention, a data reading method for motion estimation in an embedded system is provided. Before describing the data reading method for motion estimation, the embedded system will be explained first in order to allow those skilled in the art to better understand the present invention.

Figure 2:
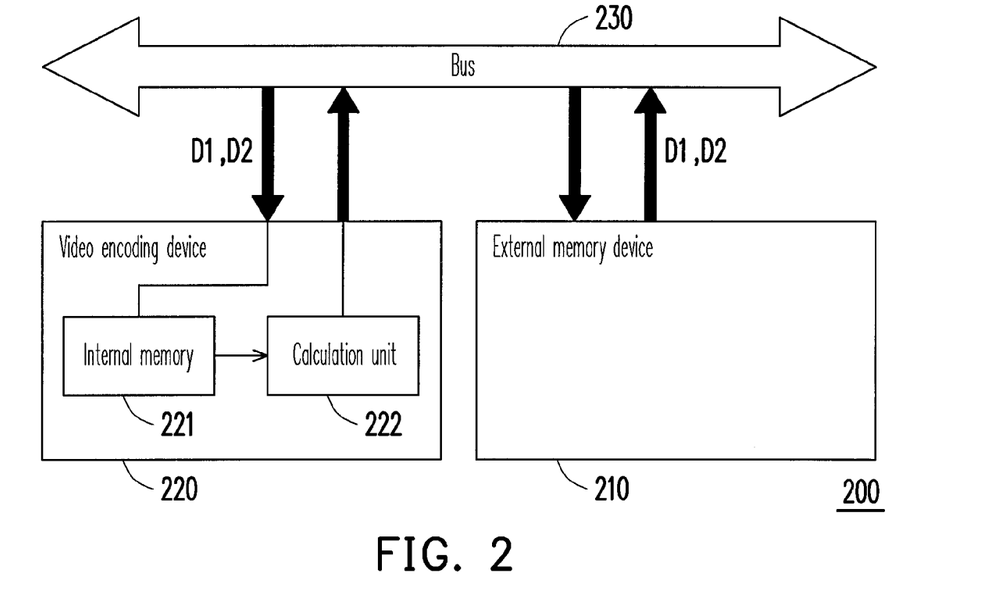
FIG. 2 is a block diagram of an embedded system according to an exemplary embodiment of the present invention.

FIG. 2 is a block diagram of an embedded system according to an exemplary embodiment of the present invention. Referring to FIG. 2, the embedded system 200 includes an external memory device 210, a video encoding device 220, and a bus 230. The video encoding device 220 includes an internal memory 221 and a calculation unit 222. The external memory device 210 is coupled to the bus 230. The video encoding device 220 is also coupled to the bus 230. To be specific, the internal memory 221 is coupled between the bus 230 and the calculation unit 222, and the calculation unit 222 is coupled to the bus 230. However, the present invention is not limited to foregoing coupling relationship. Below, the functions of foregoing elements will be described in detail.

The external memory device 210 stores a first frame, selects a comparison data D1 from the first frame, and outputs the comparison data D1 to the bus 230. The internal memory 221 in the video encoding device 220 stores a second frame. However, the present invention is not limited thereto, and the second frame may also be stored in the external memory device 210 or other devices. The video encoding device 220 divides the second frame into a plurality of sub frame sets and uses each of the sub frame sets through the data reading method for motion estimation. The video encoding device 220 further reads the comparison data D1 from the bus 230 into the internal memory 221.

Figure 3:
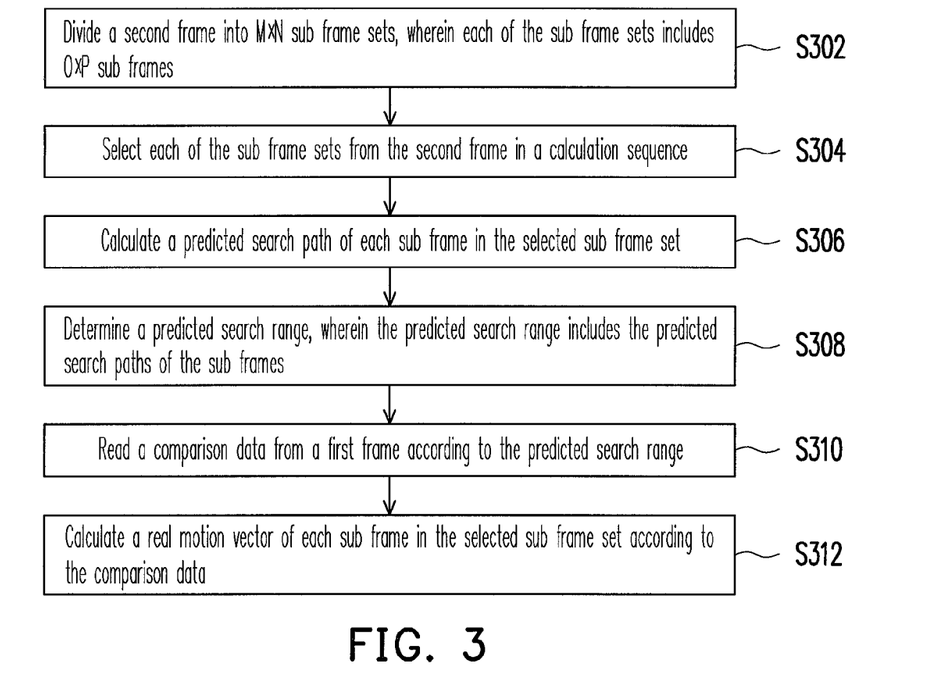
FIG. 3 is a flowchart of a data reading method for motion estimation according to an exemplary embodiment of the present invention.

Next, the data reading method for motion estimation used by the embedded system 200 will be described with reference to FIG. 2 and FIG. 3. FIG. 3 is a flowchart of a data reading method for motion estimation according to an exemplary embodiment of the present invention. In step S302, the embedded system 200 divides a second frame into M×N sub frame sets, wherein each of the sub frame sets includes O×P sub frames, and M, N, O, and P are all integers greater than or equal to 1. In step S304, the embedded system 200 selects each of the sub frame sets from the second frame in a calculation sequence. For example, the calculation sequence is to select each of the sub frame sets from left to right and from top to bottom. The selected sub frame set is stored into the internal memory 221, namely, the video encoding device 220 loads the selected sub frame set into the internal memory 221 if the second frame is not stored in the internal memory 221. In step S306, a predicted search path of each sub frame in the sub frame set selected in step S304 is calculated.

Figure 4:
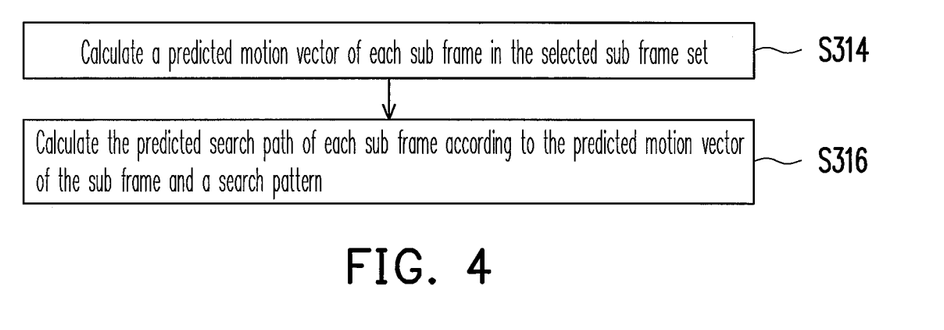
FIG. 4 is a flowchart of calculating a predicted search path for motion estimation according to an exemplary embodiment of the present invention.

The step S306 further includes several sub steps. FIG. 4 is a flowchart of calculating a predicted search path for motion estimation according to an exemplary embodiment of the present invention. Referring to FIG. 2 and FIG. 4, in step S314, the calculation unit 222 calculates a predicted motion vector of each sub frame in the selected sub frame set. In step S316, the calculation unit 222 calculates the predicted search path of each sub frame according to the predicted motion vector of the sub frame and a search pattern. It should be mentioned that in following exemplary embodiments of the present invention, a search pattern using a 3-step search algorithm is adopted; however, the present invention is not limited thereto, and other hierarchical search algorithms (N-step search algorithms, for example, a 4-step search algorithm) may also be adopted according to the actual requirement.

Figure 5:
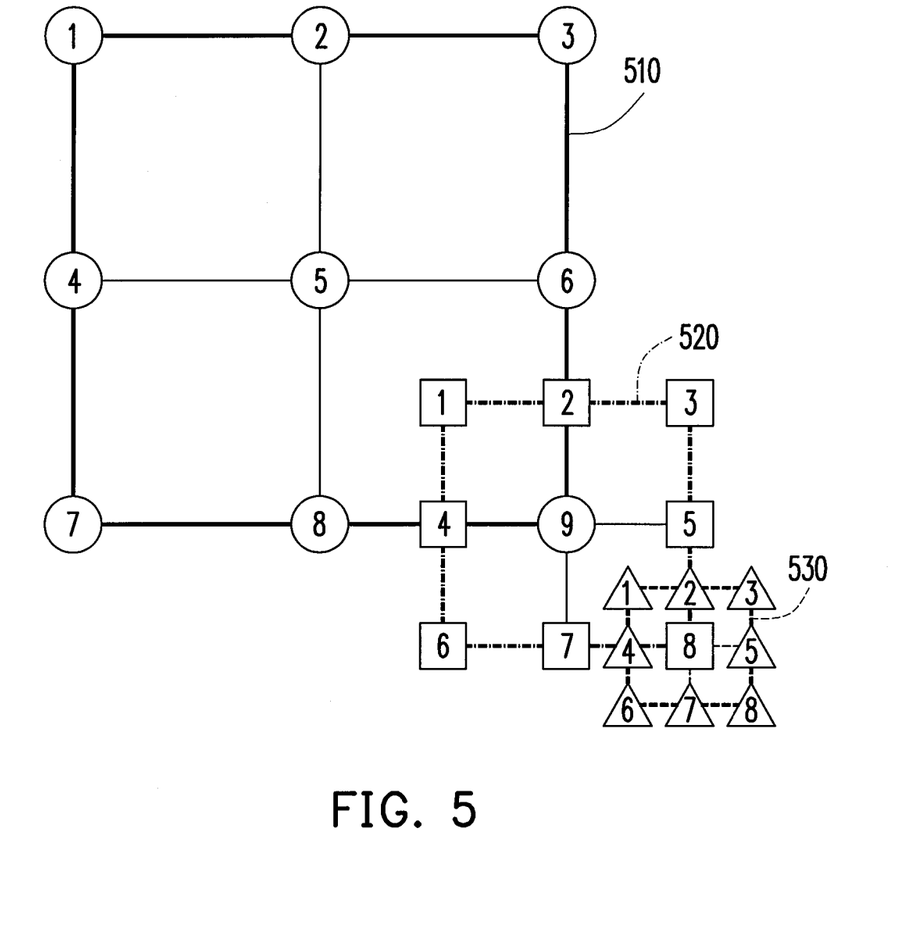
FIG. 5 illustrates a search pattern adopting a 3-step search algorithm.

In step S308, the calculation unit 222 determines a predicted reading range, wherein the predicted reading range includes the predicted search paths of the sub frames obtained in step S306. For example, a union of the predicted search paths of the sub frames can be served as the predicted reading range. In step S310, the video encoding device 220 reads the comparison data D1 from the first frame in the external memory device 210 according to the predicted reading range determined in step S308. To be specific, the video encoding device 220 selects and outputs the comparison data D1 from the first frame in the external memory device 210 according to the predicted reading range determined in step S308. Finally, the video encoding device 220 receives the comparison data D1 and stores it into the internal memory 221. After reading the comparison data D1, in step S312, the video encoding device 220 calculates a real motion vector of each sub frame in the selected sub frame set according to the comparison data D1. For example, after the video encoding device 220 receives the comparison data D1, it calculates the real motion vector of each sub frame in the selected sub frame set according to a search pattern adopting a 3-step search algorithm by calculating the sum of absolute difference (SAD) between pixels. FIG. 5 illustrates a search pattern adopting the 3-step search algorithm. Referring to FIG. 5, when the real motion vector of a sub frame is calculated by using the 3-step search algorithm, the real motion vector can be calculated in 3 phases. During the first phase, the SAD of each area in the search pattern 510 is calculated. If the bottom right area 9 in the search pattern 510 (denoted as a circle) is the area having the smallest SAD, in the second phase, the SAD of each area in the search pattern 520 is calculate. If the bottom right area 8 in the search pattern 520 (denoted as a rectangle) is the area having the smallest SAD, in the third phase, the SAD of each area in the search pattern 530 is calculated. If the area 8 in the search pattern 530 (denoted as a triangle) is the area having the smallest SAD, the real motion vector is defined as the vector from the area 5 in the search pattern 510 to the area 8 in the search pattern 530.

If the real motion vector cannot be calculated based on the comparison data D1 in step S312, a comparison data D2 can be further selected from the first frame in the external memory device 210 according to the calculated SAD values to calculate the real motion vector.

Additionally, in step S306, the predicted search path of each sub frame may be calculated according to a predicted motion vector of the sub frame and a search pattern. To be specific, if the selected sub frame is located in the $i^{th}$ column and the $j^{th}$ row of the second frame, a statistical calculation is performed according to the real motion vector of a processed sub frame in the $i^{th}$ column or the $j^{th}$ row, so as to obtain the predicted motion vector of the selected sub frame, wherein both i and j are integers greater than or equal to 1, i is smaller than or equal to M×O, and j is smaller than or equal to N×P. To be more specific, when both O and P are 2, each predicted motion vector can be obtained respectively through following expressions (1)~(4):

$$MV_{P(i,j)} = [(MV_{R(i,j-1)} + MV_{R(i-1,j)})/2] \pm MV_{E1} \quad (1)$$

$$MV_{P(i+1,j)} = [(2MV_{R(i+1,j-1)} + MV_{R(i-1,j)})/3] \pm MV_{E2} \quad (2)$$

$$MV_{P(i,j+1)} = [(MV_{R(i,j-1)} + 2MV_{R(i-1,j+1)})/3] \pm MV_{E3} \quad (3)$$

$$MV_{P(i+1,j+1)} = [(MV_{R(i,j-1)} + MV_{R(i-1,j)} + 2MV_{R(i+1,j-1)} + 2MV_{R(i-1,j+1)})/6] \pm MV_{E4} \quad (4)$$

wherein $MV_{P(i,j)}$ if the predicted motion vector of the sub frame in the $i^{th}$ column and the $j^{th}$ row, $MV_{R(i,j)}$ is the real motion vector of the sub frame in the $i^{th}$ column and the $j^{th}$ row, $MV_{E1}$ is a first error vector, $MV_{E2}$ is a second error vector, $MV_{E3}$ is a third error vector, and $MV_{E4}$ is a fourth error vector.

Figure 6:
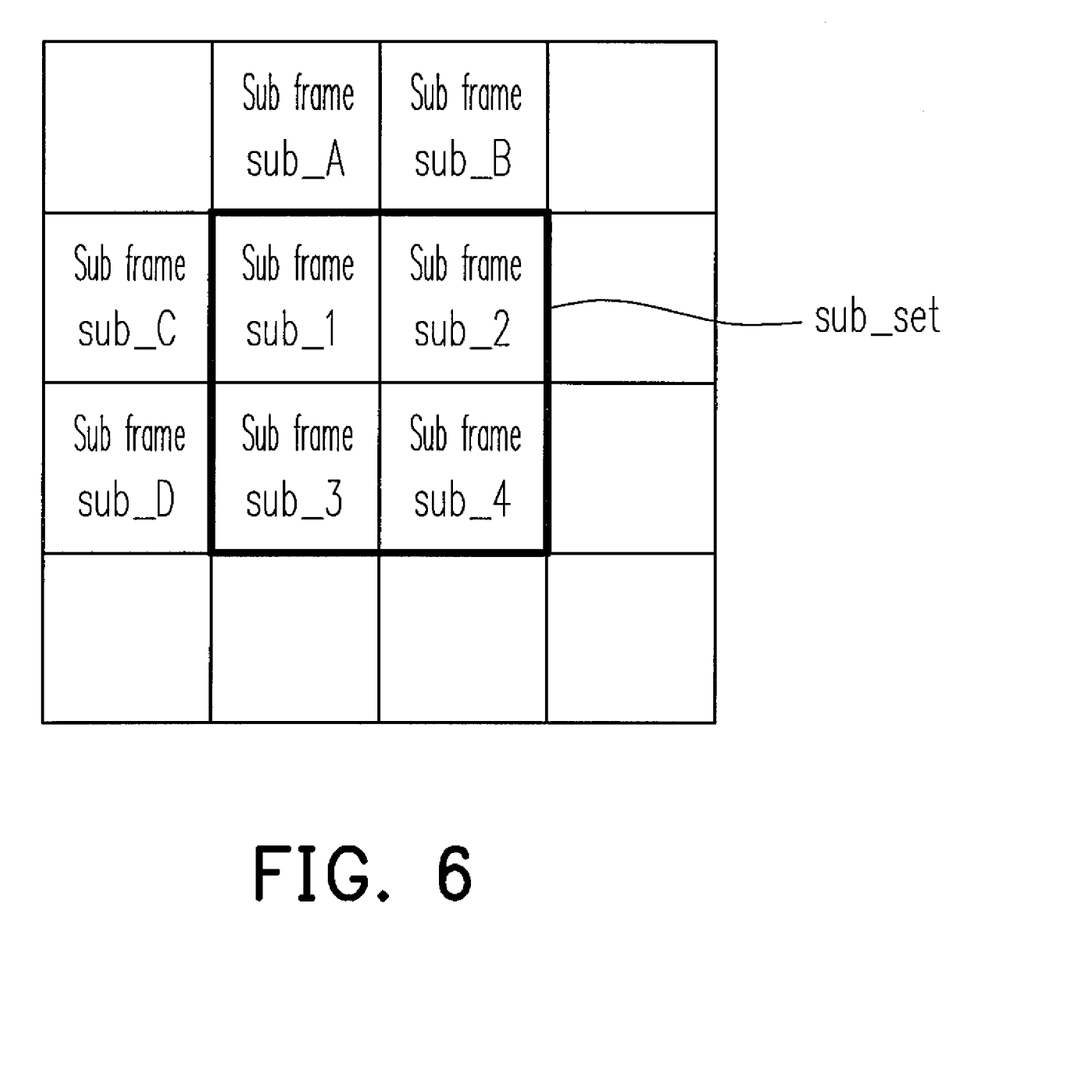
FIG. 6 illustrates an example of how to calculate motion vectors according to an exemplary embodiment of the present invention.

FIG. 6 illustrates an example of how to calculate predicted motion vectors according to an exemplary embodiment of the present invention. Referring to FIG. 2 and FIG. 6, the calculation unit 222 divides a second frame into M×N sub frame sets sub_set, wherein each of the sub frame sets has O×P sub frames. When O=P=2, each sub frame set has 4 sub frames, and the sub frame sets can be selected in a zigzag order. Herein the sub frame set sub_set has four sub frames sub_1, sub_2, sub_3, and sub_4. Then, the calculation unit 222 calculates the predicted motion vector of each sub frame in the sub frame set sub_set. To be specific, the predicted motion vector $MV_1$ of the sub frame sub_1, the predicted motion vector $MV_2$ of the sub frame sub_2, the predicted motion vector $MV_3$ of the sub frame sub_3, and the predicted motion vector $MV_4$ of the sub frame sub_4 in the sub frame set sub_set can be respectively obtained according to the real motion vector $MV_A$ of the sub frame sub_A, the real motion vector $MV_B$ of the sub frame sub B, the real motion vector $MV_C$ of the sub frame sub C, and the real motion vector $MV_D$ of the sub frame sub_D through following expressions (5)~(8):

$$MV_1 = [(MV_A + MV_V)/2] \pm MV_{E1} \quad (5)$$

$$MV_2 = [(2MV_B + MV_C)/3] \pm MV_{E2} \quad (6)$$

$$MV_3 = [(MV_A + 2MV_D)/3] \pm MV_{E3} \quad (7)$$

$$MV_4 = [(MV_A + MV_C + 2MV_B + 2MV_D)/6] \pm MV_{E4} \quad (8)$$

wherein $MV_{E1}$, $MV_{E2}$, $MV_{E3}$, and $MV_{E4}$ are error vectors and which represent that the predicted motion vectors $MV_1$, $MV_2$, $MV_3$, and $MV_4$ can change within a certain range, and the error vectors can be determined according to the actual requirement.

After obtaining the predicted motion vector of each sub frame in the sub frame set sub_set, the predicted search path of each sub frame is calculated according to the search pattern using the 3-step search algorithm. For example, referring to FIG. 5, as described above, if the real motion vector is a vector from the area 5 in the search pattern 510 to the area 8 in the search pattern 530, a real search path including the search pattern 510, the search pattern 520, and the search pattern 530 can be obtained. Similarly, if the predicted motion vectors are calculated through foregoing expressions (1)~(4), the predicted search paths corresponding to the predicted motion vectors can be obtained according to the predicted motion vectors and the search pattern adopting the 3-step search algorithm.

Referring to FIG. 2 and FIG. 6, after the predicted search paths of the sub frames sub_1, sub_2, sub_3, and sub_4 in the sub frame set sub_set are obtained, the calculation unit 222 determines a predicted reading range, wherein the predicted reading range is a union of the predicted search paths of the sub frames $sub_1$, sub_2, sub_3, and sub_4. The external memory device 210 selects the corresponding data from the first frame according to the predicted reading range and outputs the selected data as the comparison data D1. Finally, the video encoding device 220 receives the comparison data D1. The relationship between the predicted reading range and the predicted search paths will be described below with an example.

Figure 7:
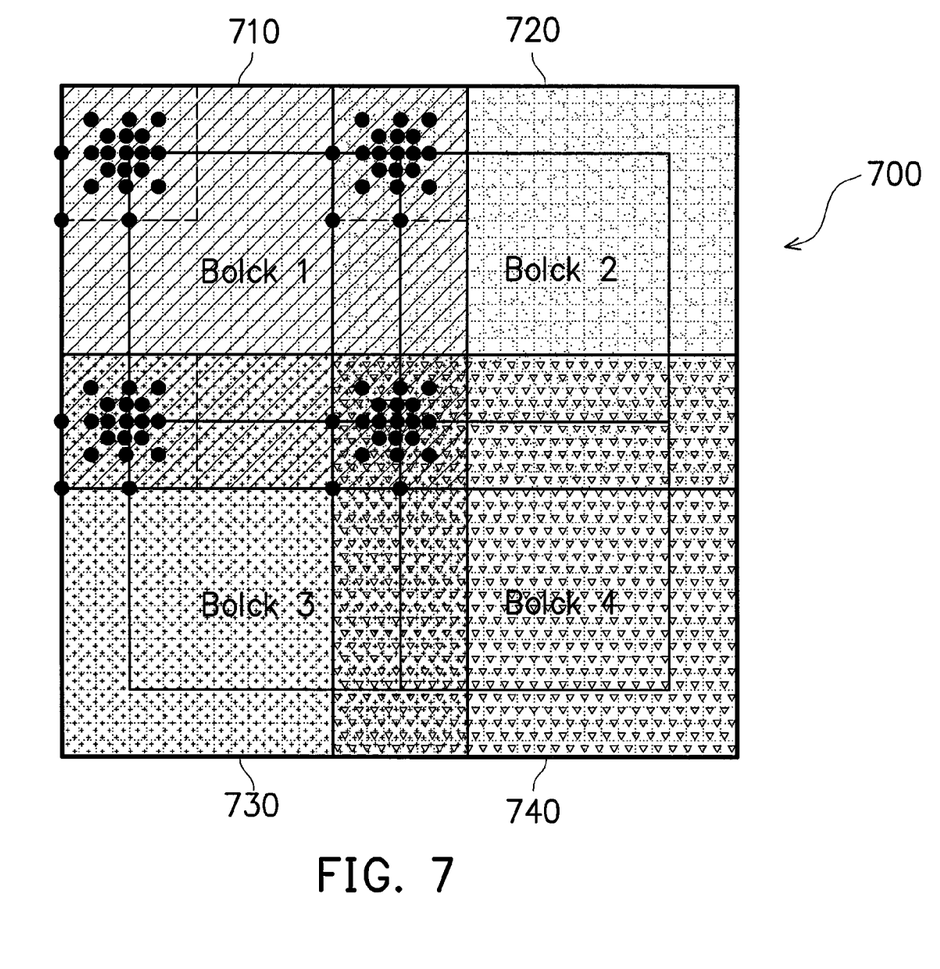
FIG. 7 illustrates an example of how to calculate predicted search range according to an exemplary embodiment of the present invention.

FIG. 7 illustrates an example of how to calculate predicted search range according to an exemplary embodiment of the present invention. Referring to FIG. 7, in the present example, each sub frame set has four sub frames, wherein the predicted search path 710 of the sub frame Bolck1 is obtained according to the predicted motion vector of the sub frame Bolck1 and a search pattern. Similarly, the predicted search paths 720, 730, and 740 of the sub frames Bolck2, Bolck3, and Bolck4 are obtained according to the predicted motion vectors of the sub frames Bolck2, Bolck3, and Bolck4 and the search pattern. The predicted reading range 700 includes the predicted search paths 710, 720, 730, and 740 of the sub frames Bolck1, Bolck2, Bolck3, and Bolck4. The predicted search paths are filled up with different patterns in FIG. 7. For example, the area filled with diagonal lines is the range of the predicted search path 710.

As described above, the present invention provides a data reading method for motion estimation in an embedded system, wherein the calculation algorithm of the motion estimation is improved, and a comparison data to be read is determined by calculating a predicted motion vector or a predicted search path of each sub frame. A plurality of sub frames form a sub frame set. By reading the comparison data in unit of sub frame sets, the quantity of data repeatedly read between the sub frames, the calculation load, and memory usage are all reduced. In addition, a search pattern adopting a hierarchical search algorithm (for example, a 3-step or 4-step search algorithm) is applied in the present invention, wherein the actual search algorithm used in the present invention can be determined according to the actual requirement. According to the present invention, the comparison data is read in unit of sub frame sets, so that the quantity of data repeatedly read between the sub frames can be reduced. Herein, the number of the sub frames in each sub frame set is not limited, and it is within the scope and spirit of the present invention as long as the quantity of data to be repeatedly read between the sub frames is reduced by reading the comparison data in unit of the sub frame sets.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data reading method for motion estimation in an embedded system, wherein the embedded system comprises a video encoding device and an external memory device, the video encoding device comprises an internal memory, and the external memory device stores a first frame, the data reading method comprising:
dividing a second frame into M×N sub frame sets by the embedded system, wherein each of the sub frame sets comprises O×P sub frames, and M, N, O, and P are integers greater than or equal to 1;
selecting each of the sub frame sets from the second frame in a calculation sequence by the embedded system, wherein the selected sub frame set is stored into the internal memory;
calculating a predicted search path of each of the sub frames in the selected sub frame set by the video encoding device;
determining a predicted reading range by the video encoding device, wherein the predicted reading range comprises the predicted search paths of the sub frames; and
reading a comparison data from the first frame in the external memory device according to the predicted reading range by the video encoding device,
wherein the step of calculating the predicted search path comprises:
calculating a predicted motion vector of each of the sub frames in the selected sub frame set; and
calculating the predicted search path of each of the sub frames according to the predicted motion vector of the sub frame and a search pattern,
wherein in the step of calculating the predicted motion vector of each of the sub frames in the selected sub frame set, if the selected sub frame is in an $i^{th}$ column and a $j^{th}$ row of the second frame, a statistical calculation is performed according to a real motion vector of a calculated sub frame in the $i^{th}$ column or the $j^{th}$ row to calculate the predicted motion vector of the selected sub frame, wherein i and j are both integers greater than or equal to 1, i is smaller than or equal to M×O, and j is smaller than or equal to N×P; wherein when O and P are both 2, $$MV_{P(i,j)} = [(MV_{R(i,j-1)} + MV_{R(i-1,j)})/2] \pm MV_{E1}$$
$$MV_{P(i+1,j)} = [(2MV_{R(i+1,j-1)} + MV_{R(i-1,j)})/3] \pm MV_{E2}$$
$$MV_{P(i,j+1)} = [(MV_{R(i,j-1)} + 2MV_{R(i-1,j+1)})/3] \pm MV_{E3}$$
$$MV_{P(i+1,j+1)} = [(MV_{R(i,j-1)} + MV_{R(i-1,j)} +$$
$$2MV_{R(i+1,j-1)} + 2MV_{R(i-1,j+1)})/6] \pm MV_{E4}$$

wherein $MV_{P(i,j)}$ is the predicted motion vector of the sub frame in the $i^{th}$ column and the $j^{th}$ row, $MV_{R(i,j)}$ is the real motion vector of the sub frame in the $i^{th}$ column and the $j^{th}$ row, $MV_{E1}$ is a first error vector, $MV_{E2}$ is a second error vector, $MV_{E3}$ is a third error vector, and $MV_{E4}$ is a fourth error vector.

2. The data reading method according to claim 1, wherein the search pattern adopts a hierarchical search algorithm.

3. The data reading method according to claim 1, wherein the calculation sequence is to calculate from left to right and from top to bottom.

4. The data reading method according to claim 1, wherein after reading the comparison data, the data reading method further comprises:
calculating a real motion vector of each of the sub frames in the selected sub frame set according to the comparison data.

5. An embedded system, comprising:
an external memory device, for storing a first frame; and
a video encoding device, comprising an internal memory, wherein the embedded system divides a second frame into M×N sub frame sets, and each of the sub frame sets comprises O×P sub frames, wherein M, N, O, and P are all integers greater than or equal to 1, and the embedded system selects each of the sub frame sets from the second frame in a calculation sequence, wherein the selected sub frame set is stored into the internal memory, the video encoding device calculates a predicted search path of each of the sub frames in the selected sub frame set and determines a predicted reading range, wherein the predicted reading range comprises the predicted search paths of the sub frames, and the video encoding device reads a comparison data from the first frame in the external memory device into the internal memory according to the predicted reading range, wherein the video encoding device further comprises:

a calculation unit, for calculating a predicted motion vector of each of the sub frames in the selected sub frame set and calculating the predicted search path of each of the sub frames according to the predicted motion vector of the sub frame and a search pattern, wherein if the selected sub frame is in an $i^{th}$ column and a $j^{th}$ row of the second frame, the calculation unit performs a statistical calculation according to a real motion vector of a calculated sub frame in the $i^{th}$ column or the $j^{th}$ row to calculate the predicted motion vector of the selected sub frame, wherein i and j are both integers greater than or equal to 1, i is smaller than or equal to M×O, and j is smaller than or equal to N×P, wherein when O and P are both 2, the calculation unit calculates the predicted motion vector of the selected sub frame as:

$$MV_{P(i,j)} = [(MV_{R(i,j-1)} + MV_{R(i-1,j)})/2] \pm MV_{E1}$$

$$MV_{P(i+1,j)} = [(2MV_{R(i+1,j-1)} + MV_{R(i-1,j)})/3] \pm MV_{E2}$$

-continued $$MV_{P(i,j+1)} = [(MV_{R(i,j-1)} + 2MV_{R(i-1,j+1)})/3] \pm MV_{E3}$$

$$MV_{P(i+1,j+1)} = [(MV_{R(i,j-1)} + MV_{R(i-1,j)} + 2MV_{R(i+1,j-1)} + 2MV_{R(i-1,j+1)})/6] \pm MV_{E4}$$

wherein $MV_{P(i,j)}$ is the predicted motion vector of the sub frame in the $i^{th}$ column and the $j^{th}$ row, $MV_{R(i,j)}$ is the real motion vector of the sub frame in the $i^{th}$ column and the $j^{th}$ row, $MV_{E1}$ is a first error vector, $MV_{E2}$ is a second error vector, $MV_{E3}$ is a third error vector, and $MV_{E4}$ is a fourth error vector.

6. The embedded system according to claim 5, wherein the search pattern used by the calculation unit adopts a hierarchical search algorithm.

7. The embedded system according to claim 5, wherein the calculation sequence used by the calculation unit is to calculate from left to right and from top to bottom.

8. The embedded system according to claim 5, wherein after the calculation unit reads the comparison data, the calculation unit further calculates a real motion vector of each of the sub frames in the selected sub frame set according to the comparison data.

* * * * *